UNITED STATES PATENT OFFICE.

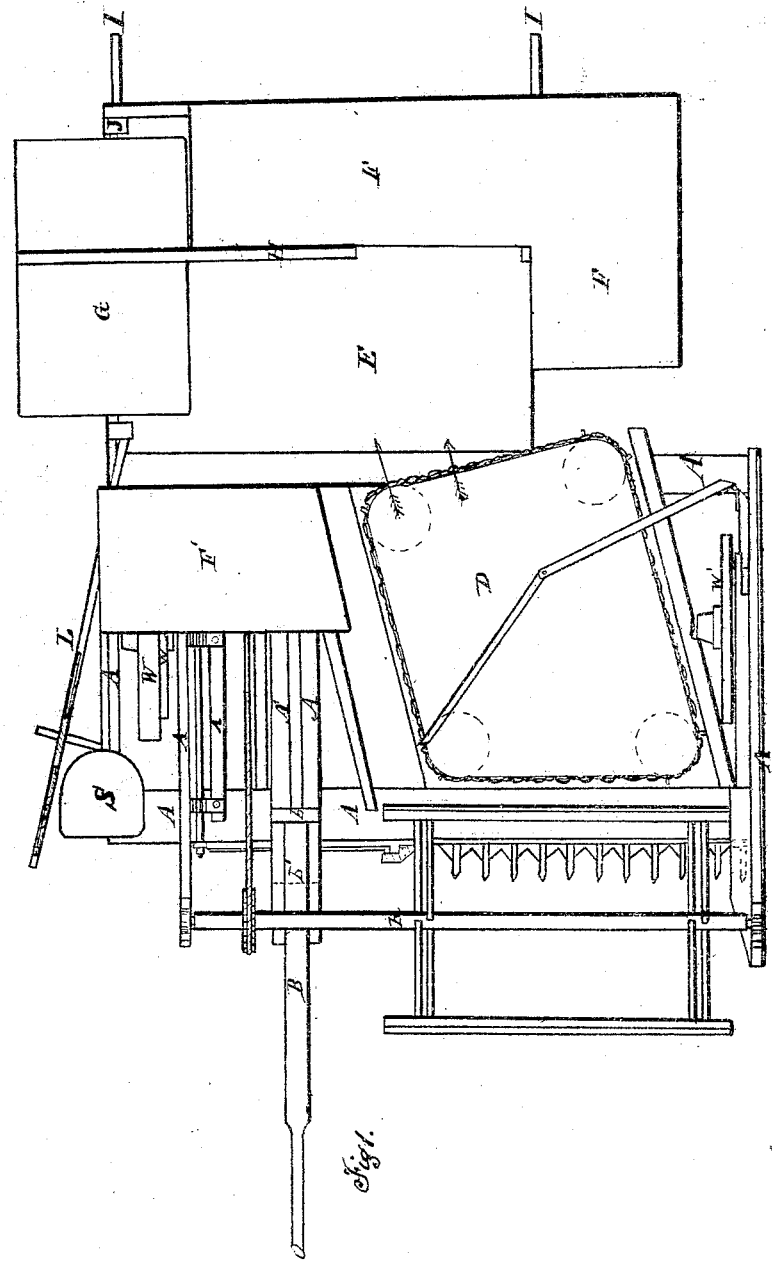

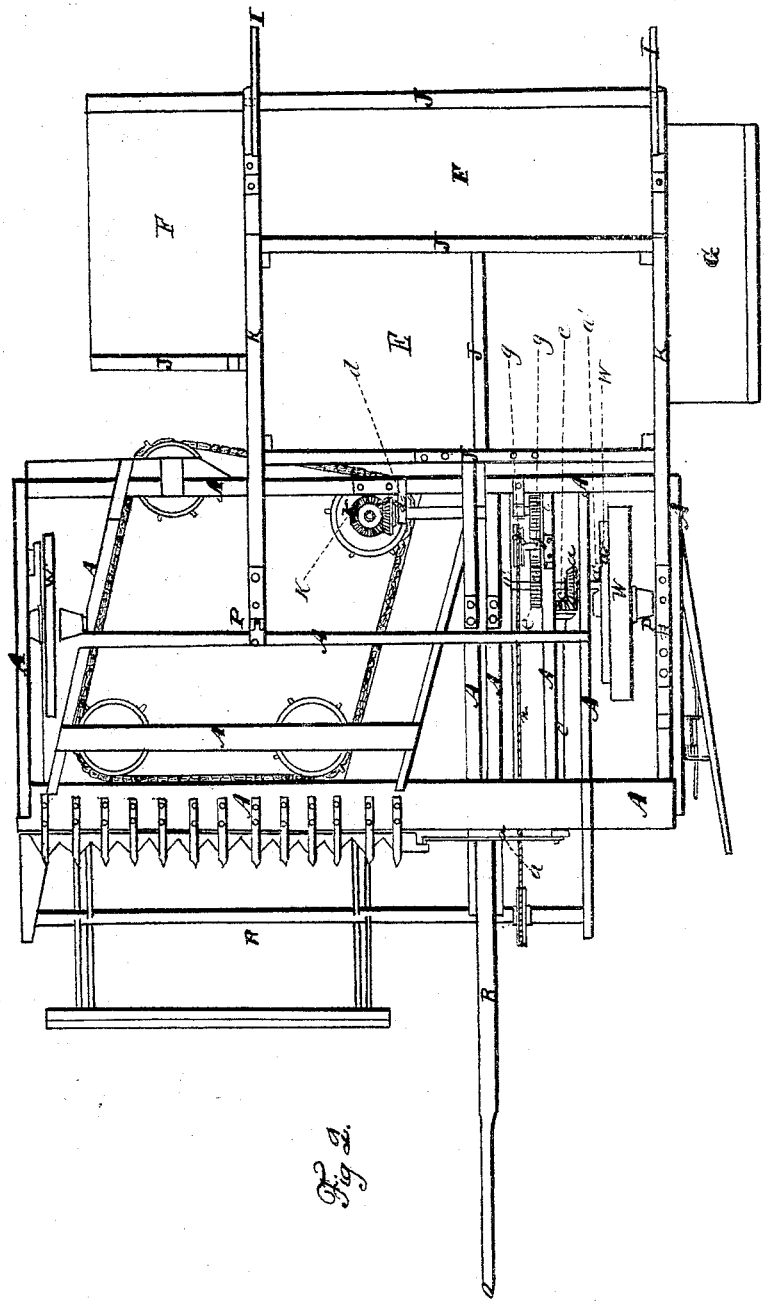

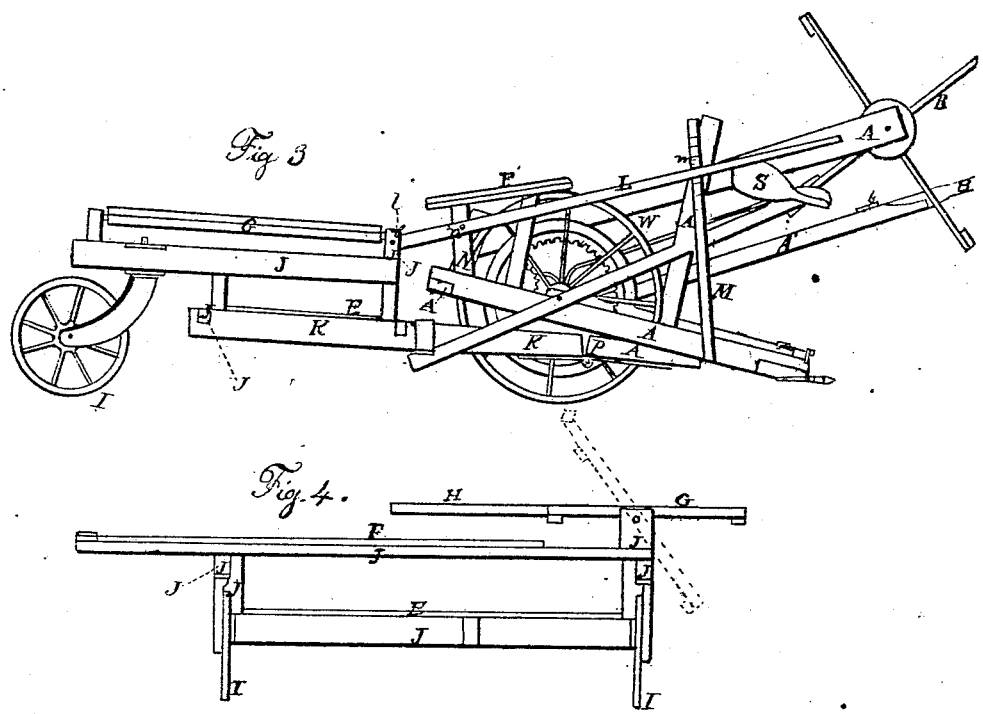

JACOB SEIBEL, OF MANLIUS, ILLINOIS.

IMPROVEMENT IN HARVESTERS.

Specification forming part of Letters Patent No. 84,006, dated November 10, 1868.

*To all whom it may concern:*

Be it known that I, JACOB SEIBEL, of Manlius, in the county of Bureau and State of Illinois, have invented a new and useful Improvement in Harvesters; and I do hereby declare and make known that the following is a full, clear, and exact description of the same, reference being had to the accompanying drawings and the letters and figures marked thereon, which form part of this specification.

My invention consists in arranging the binding-platform upon a frame independent of the harvester-frame, and so connecting or hinging the harvester-frame thereto that the front of the harvester or the cutter may be raised and lowered without disturbing the position of the binding-platform, substantially as hereinafter more fully described, the binding-platform being also arranged immediately behind and in combination with the raking-platform, with a rear delivery, so that the rake moves the grain back upon the binding-platform, while permitting the aforesaid adjustment of the harvester-frame in raising and lowering the cutter-bar.

To enable those skilled in the art to understand how to construct and make use of my said improvements, I will proceed to describe the same with particularity, making reference in so doing to the aforesaid drawings, in which—

Figure 1 represents a plan or top view of my improvement. Fig. 2 is a plan view of the lower side or bottom of the same. Fig. 3 is a side view or elevation thereof, and Fig. 4 is a rear elevation of the binding-platform and its frame.

Similar letters of reference in the several figures denote the same parts of my invention.

A represents the frame of the harvester, upon which the operating parts of the machine are arranged and supported, said frame being suitably supported upon the wheels W W', the former of which is the drive-wheel of the machine, and is provided with an annular rim, $w$, of gearing, which engage with a pinion upon the shaft $a'$, which carries a second pinion, $a$, as shown in Fig. 2.

The pinion which engages with the gearing $w$ upon the drive-wheel has a longitudinal movement upon its shaft $a'$, although revolving with it, so that it may readily be thrown into or out of gear with the drive-wheel by means of a lever, $o$, operating upon said pinion, the end of the lever being near the seat of the driver, to enable him to throw the machine into or out of gear, as desired, said lever being shown in Fig. 3.

The aforesaid pinion $a$ engages with a bevel-pinion, $c$, upon a shaft, C, which shaft is provided with an eccentric pin connected to the pitman $d$ of the cutter, so that the revolution of said shaft C gives the desired reciprocating motion to the cutter.

There is another pinion, $e$, upon the shaft $a'$, which engages with a pinion, $f$, whose shaft carries a pulley or drum, $g$, so that by means of a belt or cord, $h$, the reel $r$ is operated by the rotation of the said shaft $a'$.

The pinion $f$ also engages with a pinion, $i$, whose shaft carries a pinion or bevel-wheel, $j$, engaging with a corresponding pinion, $k$, which imparts the required motion to the rake, which moves over the platform D.

Instead of the peculiar platform and rake shown in the drawings, any of the known forms and kinds having a rear delivery may be used.

B represents the tongue or draft-pole, pivoted to the frame or hounds A' A' at $b'$, the rear end of said tongue resting under a stop, $b$, as shown, to prevent its weight from resting upon the horses' necks.

Behind the platform D a binding-platform, E, is arranged, on the same level or below the platform D, so that the grain may be raked directly from the platform D upon the binding-platform E. The said binding-platform E, and also the binding-tables F, upon which the binders place the grain to bind the same, which table is elevated sufficiently above the platform E to render it convenient to bind the grain thereupon, are supported upon a suitable frame, J K, which frame may be rigidly secured to the harvester-frame, or be formed as part of the same, and is supported at its rear end upon suitable pivoted wheels or rollers, I I, as shown.

There may be a narrow riser extending around the platform E, and also an apron extending from the rear of the platform D to the said binding-platform, to prevent any waste of grain which may shell in the manipulation of the grain, which shelled grain will be preserved upon the binding-platform.

At one side of the binding attachment there is arranged a tipping table, G, provided with a handle, H, upon which the bundles are placed by the binders until enough have accumulated to form a shock, when the tipping table G is tipped up, as seen in Fig. 4, and the bundles dropped upon the ground.

If desired, there may be an additional table, F', arranged over the drive-wheel, as shown, so that, in case of very heavy grain, an additional binder may be employed upon the platform.

Thus it will be observed that, by this arrangement of the binding-platform, the grain which, being cut, falls upon the platform of the harvester may be raked or removed therefrom and deposited upon the binding-platform by the operation of the rake, whether the rake be automatic in its operation or be operated by hand.

Two or more of the longitudinal timbers of the frame of the binding-platform K are hinged to the frame of the harvester A, as shown at P P in Figs. 2 and 3. By this arrangement it will be seen the harvester-frame A is supported at about its center, as upon a pivot, permitting the frame to rock or vibrate lengthwise, so as to raise the front thereof up or to depress the same, as desired, which motion is effected, without disturbing the binding-platform, in any suitable manner.

As one means of operating this feature of my invention, I attach, by means of a pivot or joint, $l$, a lever, L, to the front of the binding-platform or its frame, which lever is also pivoted at $n$ to an upright or post upon the rear of the frame A, as shown in Fig. 3, the front end of said lever coming up near the seat S, and being provided with a spring or catch, operating in notches $m$ upon the vertical standard M, to serve to retain the lever at the desired elevation or position. Thus it will be observed that, by pressing down upon said lever L, the rear of the frame A is lowered, and the front of said frame is correspondingly elevated, while by raising said lever the rear of the frame A is raised and the front correspondingly lowered—all which adjustments, from the manner in which the frames are hinged or connected and the arrangement of the lever L therewith, can readily be accomplished by the driver from his seat.

Having described the nature, construction, and operation of my said improvement, I will specify what I claim and desire to secure by Letters Patent:

I claim—

1. In the construction of harvesters, connecting or coupling the frame supporting the binding-platform to the main frame A by means of hinges or joints P, arranged at or near the center of said main frame, so that it may oscillate upon said hinges, to admit of the raising and lowering of the cutter-bar without tipping the binding-platform, substantially in the manner and for the purposes specified and shown.

2. In combination with said binding-platform and main frame A, hinged as described, the lever L, so connected and arranged that the driver, from his seat on the main frame, can operate the machine, in the manner and for the purposes set forth.

3. In combination with a harvesting-machine having a raking-platform with a rear delivery, a binding-platform arranged close behind the raking-platform, and hinged to the main frame at or near its center, substantially as described, so that the grain can be raked directly from the raking to the binding platform, and otherwise operating substantially as specified.

JACOB SEIBEL.

Witnesses:
W. E. MARRS,
L. L. COBURN.